(12) United States Patent
Poirier et al.

(10) Patent No.: US 10,549,640 B2
(45) Date of Patent: Feb. 4, 2020

(54) MECHANICALLY AMPLIFIED BATTERY CELL PRESSURE SENSOR

(71) Applicant: Ford Global Technologies, LLC, Dearborn, MI (US)

(72) Inventors: Eric Poirier, Brownstown, MI (US); Benjamin A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 15/807,669

(22) Filed: Nov. 9, 2017

(65) Prior Publication Data

US 2019/0135111 A1    May 9, 2019

(51) Int. Cl.
| | |
|---|---|
| H01M 2/34 | (2006.01) |
| B60L 3/00 | (2019.01) |
| H01M 10/42 | (2006.01) |
| B60L 3/12 | (2006.01) |
| H01M 10/48 | (2006.01) |

(52) U.S. Cl.
CPC .............. *B60L 3/0046* (2013.01); *B60L 3/12* (2013.01); *H01M 2/345* (2013.01); *H01M 10/425* (2013.01); *H01M 10/486* (2013.01); *B60L 2250/16* (2013.01); *H01M 2010/4271* (2013.01); *H01M 2200/20* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 9,531,039 B2 | 12/2016 | Heubner et al. | |
| 2009/0053586 A1* | 2/2009 | Fredriksson | H01M 2/08 429/57 |
| 2015/0188198 A1 | 7/2015 | Bonhomme et al. | |

FOREIGN PATENT DOCUMENTS

WO    2017087807 A1    5/2017

* cited by examiner

*Primary Examiner* — Wyatt P McConnell
(74) *Attorney, Agent, or Firm* — David Kelley; Brooks Kushman, P.C.

(57) ABSTRACT

A vehicle battery management system is disclosed. The system may include a cell casing and a tripwire. The cell casing may include connected walls that surround a battery active region. At least one of those walls may define a weakened section. A tripwire may be stretched across the weakened and configured to break to interrupt current flow therethrough responsive to a pressure within the cell casing surpassing a predetermined threshold causing the weakened section to bulge towards the tripwire.

12 Claims, 3 Drawing Sheets

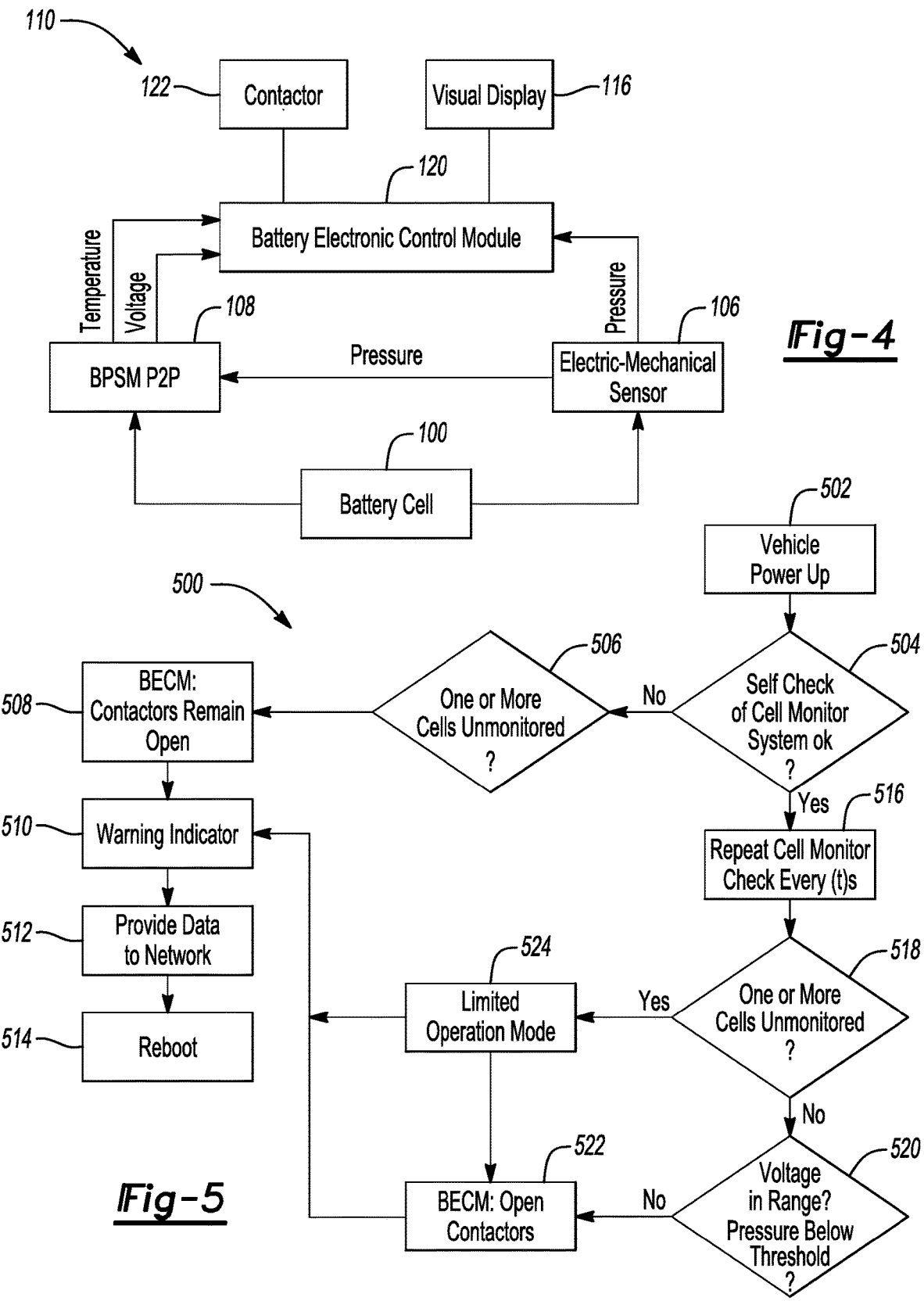

MECHANICALLY AMPLIFIED BATTERY CELL PRESSURE SENSOR

TECHNICAL FIELD

The present disclosure relates to the field of batteries and battery modules.

BACKGROUND

Hybrid vehicles typically include a high voltage battery pack adapted to provide power to various components of the vehicles, including motors, transmissions, and electrical accessories. A battery pack may consist of various chemistries, such as lithium ion, nickel metal hydride, or nickel cadmium. The battery pack may include multiple cells connected in series, parallel, or series/parallel configurations. Each cell may include a cathode, an anode, and an electrolyte as well as external electrical connections to the anode and cathode. The electrolyte is a medium that allows the ions to flow between the anode and the cathode. The anode and cathode are in electrical contact with metal current collectors which provide a means to deliver and receive electron current to an external device. It is the electrochemical reactions that occur within the cell that allows a battery pack to serve as an energy source.

The performance of the battery packs may degrade overtime because of irreversible chemical reactions at the anode or cathode during normal operation, or during abuse conditions, including but not limited to overcharging, internal shorting, external shorting, and over-discharge, among others. Gas build-up and subsequent increase in pressure within a cell may occur from the decomposition of electrolyte at the surface of the anode or cathode, such as during abuse conditions. The increase in pressure may occur gradually due to slow decomposition of the electrolyte over the cell's life, or may occur rapidly in response to a temperature increase in the cell.

SUMMARY

According to one embodiment of this disclosure, a vehicle battery management system is disclosed. The system may include a cell casing and a tripwire. The cell casing may include connected walls that surround a battery active region. At least one of those walls may define a weakened section. A tripwire may be stretched across the weakened section and configured to break to interrupt current flow therethrough responsive to a pressure within the cell casing surpassing a predetermined threshold causing the weakened section to bulge towards the tripwire.

According to another embodiment of this disclosure, a vehicle is provided. The vehicle may include a cell casing that surrounds a battery active region including a weakened section defining a stiffness less than the casing. The vehicle may also include a conductive measurement device carried by the weakened section and configured to increase in electrical resistance responsive to outward deflection of the weakened section caused by an accumulation of pressure within the cell casing.

According to yet another embodiment of this disclosure, a method of controlling a battery management system is provided. The method may include opening a set of contactors electrically connected to a battery cell in response to a strain gauge, disposed along a weakened section of the battery cell, having an electrical resistance surpassing a threshold associated with a pressure within the battery cell.

BRIEF DESCRIPTION OF THE DRAWINGS

FIG. 4 is a schematic diagram of the control circuit for the electric-mechanical sensor and integrated circuit.

FIG. 5 is a flowchart illustrating the operation of a system or method for the battery management system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
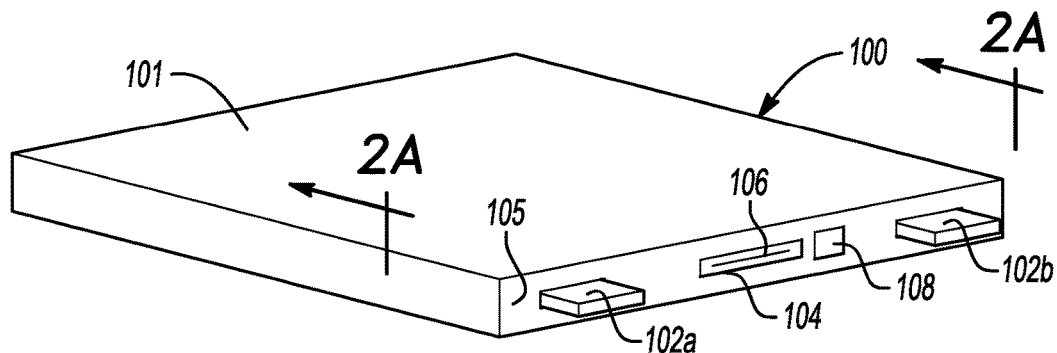
FIG. 1 is a perspective view of a battery cell that includes an electrical-mechanical pressure sensor and an integrated circuit.

Now referring to FIG. 1, a perspective view of a battery cell 100 according to one embodiment is provided. The battery cell 100 illustrated is a prismatic cell, though other configurations, e.g., pouch may be used. The cell 100 includes a cell casing 101 comprised of connected planar walls 105 that surround or enclose a battery active region. At least one planar wall 105 includes a pair of terminals 102*a* and 102*b*. The battery active region may contain an anode, cathode, electrolyte, and separator layers in an organized configuration (wound, z-fold, stacked, etc.) connected to respective external electrode terminals 102*a* and 102*b*.

The cell casing 101 includes a weakened section 104. This section is designed to be less stiff with respect to the surrounding cell walls 105 of the cell casing 101. In at least one embodiment, the weakened section may be recessed or concave and configured to deform outwardly when pressure within the cell increases. The weakened section may be accomplished in various ways. For example, the thickness of the weakened section 104 may be less than the thickness of the surrounding walls 105. In other embodiments, the weakened section 104 may include a number of scores or grooves 107 (FIG. 3B) to weaken the section 104.

In one embodiment, a tripwire 112 may be disposed or stretched across the weakened section 104. In another embodiment, an electrical-mechanical gauge 106 may be disposed along a portion of the weakened section 104. The tripwire 112 and electrical-mechanical gauge 106 may be electrically connected to a battery pack sensing module (BPSM) 108 that may be disposed between the pair of terminals 102*a* and 102*b*. The electrical-mechanical gauge 106 may be referred to as a strain gauge. In another embodiment, a Wheatstone bridge, a circuit comprised of four resistors (one of which is a strain gauge) may be implemented within the BPSM 108, for example.

As will be described in greater detail below, the gauge 106 has an electrical resistance that increases as the cross-sectional area or thickness of the gauge decreases. The cross-sectional area or thickness of the gauge may decrease as the weakened section 104 deflects in response to an accumulation of pressure within the cell 100. The BPSM 108 may also measure the voltage or change of voltage of the battery cell 100 as well as the temperature of the cell 100. In another embodiment, the BPSM 108 may have peer-to-peer (P2P) communication capabilities that enables the BPSM 108 to send the measured temperature and voltage of the battery cell 100 to a cloud or network.

Figure 2A:
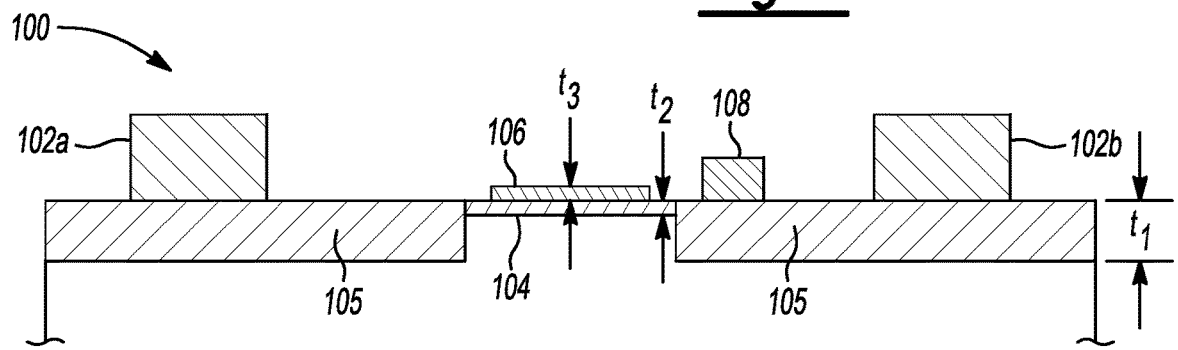
FIGS. 2A-2C are cross-sectional views of the electric-mechanical pressure sensor and battery cell in operation.
Figure 2B:
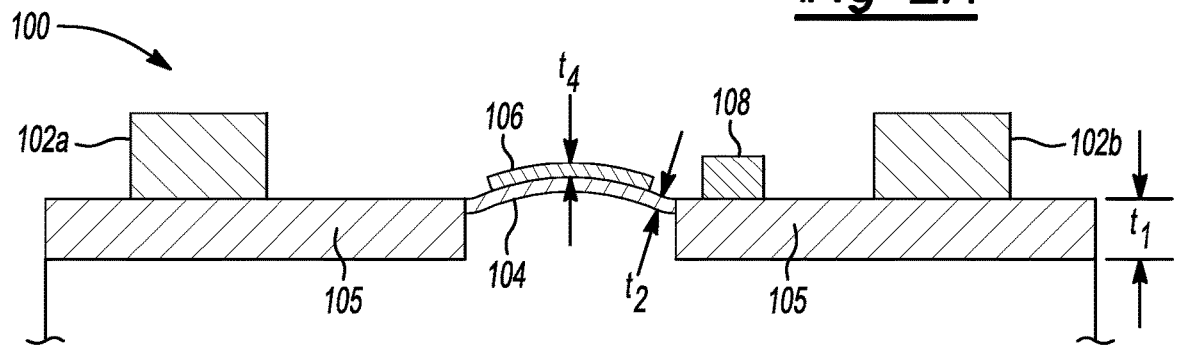
Figure 2C:
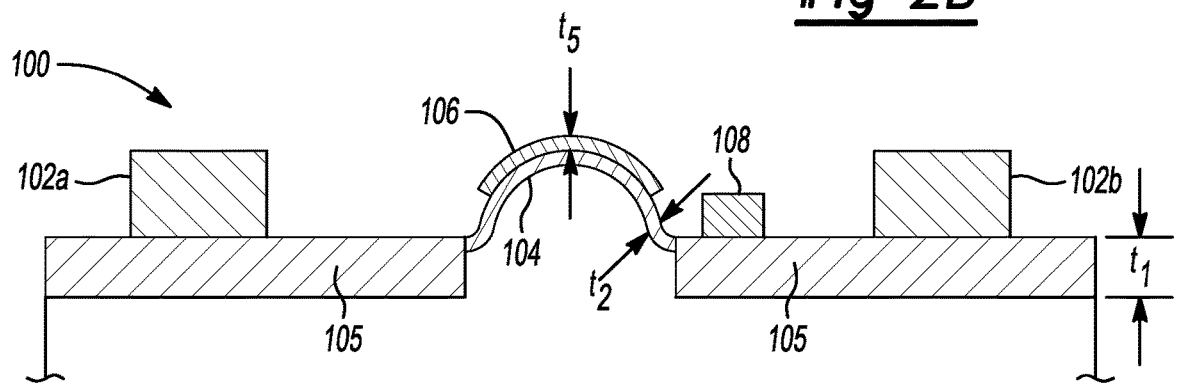

Now referring to FIGS. 2A-2C, cross-sectional views taken along the line 2-A according to a first embodiment are illustrated. The figures show one example of the battery cell 100 and electrical-mechanical gauge 106 in operation. The cross-section in FIG. 2A shows the top portion 105 of the cell 100 having an internal pressure that is less than a first threshold. The top portion 105 has a thickness $t_1$ that is greater than that of the thickness $t_2$ of the weakened section 104. The electrical-mechanical gauge 106 has a thickness $t_3$ that is greater than $t_2$ but less than $t_1$. The gauge 106 is disposed along the weakened section 104. While the weakened section 104 is illustrated to have a greater thickness of the electrical-mechanical gauge 106, in other embodiments the gauge may be thicker than the weakened section 104, or the gauge 106 and the weakened section 104 may have the same thickness.

As pressure builds within the cell 100, the weakened section 104 begins to deflect or bend outwardly away from the battery active region as illustrated in FIG. 2B. As the weakened section 104 bends, the thickness and cross-sectional area of $t_4$ of the electrical-mechanical gauge 106 decreases. The thickness $t_4$ and associated resistance may correlate to an intermediate amount of pressure that is less than the pressure associated with thickness $t_3$ of the electrical-mechanical gauge 106. The weakened section 104 and the gauge 106 illustrated in FIG. 2C is deflected by a greater amount than in FIG. 2A and FIG. 2B. Because the weakened section 104 deflects more, the cross-sectional area or thickness $t_5$ of the electrical mechanical gauge 106 decreases and the electrical resistance of the gauge 106 increases.

In response to the decreasing cross-sectional area and thickness $t_4$, the electrical resistance of the gauge increases. The electrical resistance may be measured by a Wheatstone bridge that is related to strain, a measure of deformation with reference to a known length. The change in resistance may be correlated to a known pressure within the cell. As will be described in greater detail below, the resistance may be provided to the integrated circuit 108 or one or more controllers so that appropriate action may be taken.

Figure 2D:
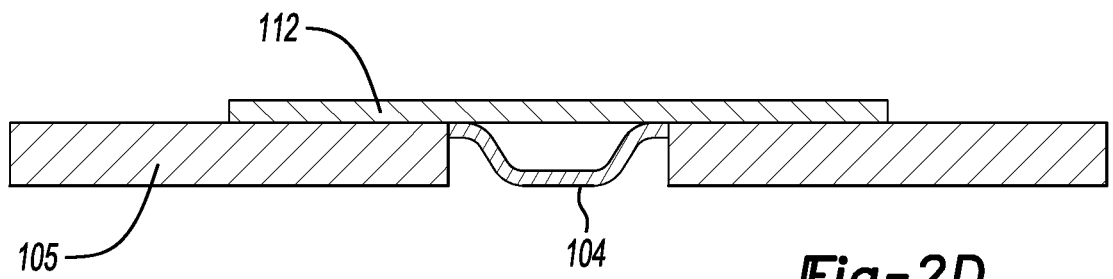
FIGS. 2D-2E are cross-sectional views of the tripwire and battery cell in operation.
Figure 2E:
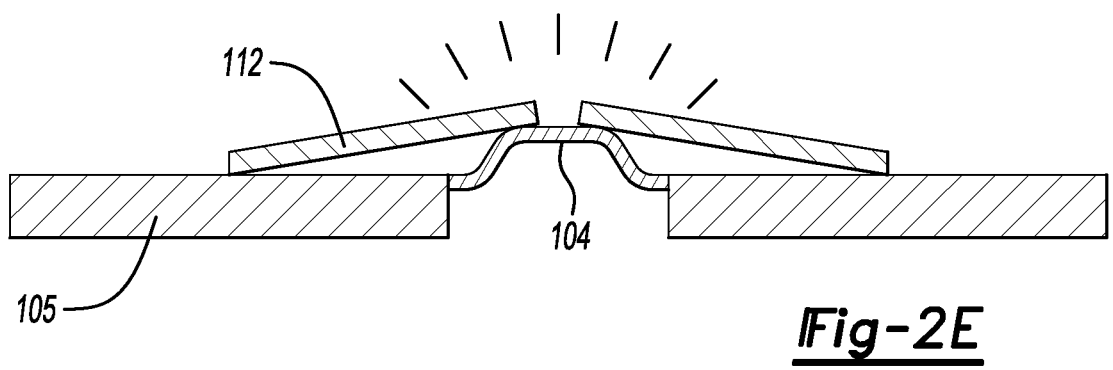

Now referring to FIG. 2D-2E cross-sectional views taken along the line 2-2 according to a second embodiment is illustrated. Similar to the cross-sectional views illustrated in FIGS. 2A-2C, the battery cell 100 includes a planar wall 105 that includes a semi-rigid region 104. The semi-rigid region 104 is concave with respect to the top surface of the planar wall 105. An electric wire 112 is disposed across semi-rigid section 104. The wire conducts electricity and may be electrically connected to one or more controllers. As pressure builds within the cell 100 and exceeds a threshold, the semi-rigid section bows or deflects towards the electrical wire 112. The wire is then broken, terminating electrical flow across the wire. The electrical wire may be a continuous filament or two or more filaments that are connected to one another and configured to break at the connecting point. The configuration in the second embodiment, illustrated in FIGS. 2D-2E, may provide a cost-efficient alternative to those of the first embodiment.

Figure 3A:
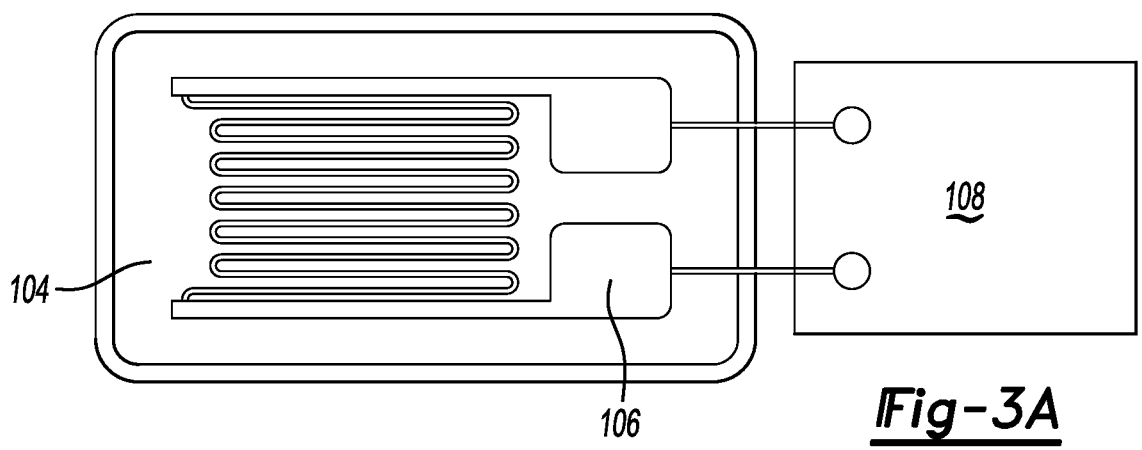
FIGS. 3A-3B are detailed views of the electric-mechanical pressure sensor and integrated circuit.
Figure 3B:
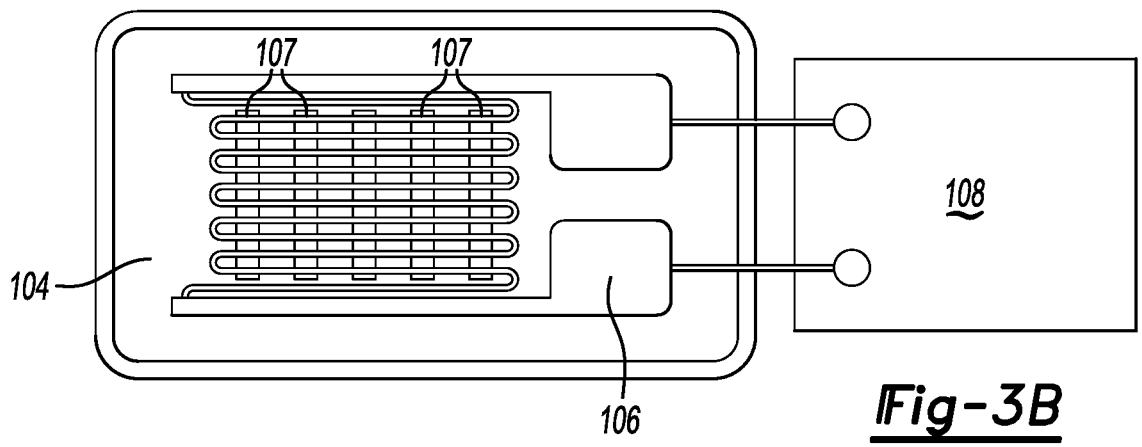

Now referring to FIG. 3A and FIG. 3B detailed views of the semi-rigid section 104 and electrical-mechanical gauge 106 are illustrated. The electrical-mechanical gauge 106 may be disposed along and connected to the semi-rigid section 104 by an adhesive or other suitable fastening method. The gauge 106 includes two ends that are attached to the integrated circuits 108. Referring specifically to FIG. 3B, the semi-rigid section 104 includes a plurality of weakening slots or cutouts 107. The slots 107 may facilitate the bending and displacement of the semi-rigid section 104.

Now referring to FIG. 4 a schematic diagram of a battery management system 110 is illustrated. The battery management system 110 includes a battery electronic control module (BECM) 120 that is in communication with the BPSM 108 and the electrical mechanical gauge 106. As described in greater detail below, the BECM may perform various algorithms or functions associated with physical characteristics associated with the cell 100. Further the BECM is connected to various types of non-transitory or tangible computer program products or storage media implementing both temporary or non-persistent storage and persistent storage. In this illustrative embodiment, the non-persistent or temporary storage is implemented by random access memory (RAM) and the persistent storage is implemented by a non-transitory computer program product or medium such as a hard disk drive (HDD), flash drive, or flash memory. In general, persistent memory or storage can include all forms of memory or storage that maintain data when a computer or other device is powered down. This includes, but is not limited to, HDDs, CDs, DVDs, magnetic tapes, solid state drives, portable USB drives and any other suitable form of persistent memory.

The BECM 120 is also provided with a number of different inputs and outputs to facilitate user interaction with the processor and related devices. In this illustrative embodiment, the electrical-mechanical gauge 106 and BPSM 108 may provide various measurements of the cell 100 to the BECM. Although not explicitly illustrated, vehicle components and auxiliary components in communication with the BECM 120 may use a wired or wireless vehicle network (including, but not limited to, a CAN bus) to communicate signals representing data to and from the BECM 120 (or components thereof). In one embodiment, the electrical mechanical sensor 106 may provide a signal (electrical resistance) that is indicative of the pressure within the cell 100 to the BPSM 108. In another embodiment, the electrical mechanical sensor 106 may provide the signal directly to the BECM 120. In another embodiment, the electrical mechanical sensor 106 may provide the signal to both the BECM 120 and the BPSM 108.

System outputs may include, but are not limited to a visual display 116 and one or more contactors 122. The BECM 120 may go into limited operation mode, decreasing the amount of current drawn from the battery cells, or alert a user of the state of the cells by altering the visual display 116. Moreover, in certain circumstances the BECM 120 may send a signal to open one or more contactors to cease the flow of current from the battery cells 100 to one or more components. Under certain conditions, pressure may accumulate within the battery cell 100. The pressure build-up within the cell may deflect or bend the weakened section 104 and decrease the cross-sectional area or thickness of the electrical-mechanical gauge 106. While the electrical mechanical sensor 106 is shown connected to the BECM,

120, in other embodiments, the sensor 106 may communicate the measured resistance (and associated pressure) to the BPSM 108. In addition to the measured pressure, the temperature and voltage may be measured by the BPSM 108. The electrical-mechanical gauge 106 and the BPSM 108 may provide these measurements to the BECM 120.

Although only one cell 100 associated with the BPSM 108 and the electrical-mechanical sensors 106 are illustrated, more than one cell in communication with the sensor 106 and BPSM 108 may be used. As previously mentioned, the BPSM 108 may communicate by peer to peer communication so that one or more BPSM sensors 108 associated with additional battery cells 100 provides the measured resistance of the sensor 106, temperature and voltage of the cell 100 to the other BPSM sensors 108 and the BECM 120. The BECM may be provided with an operating system including an API to communicate with modem application software. The modem application software may access an embedded module or firmware of a BLUETOOTH transceiver. BLUETOOTH is a subset of IEEE 802 PAN (personal area network) protocols. IEEE 802 LAN (local area network) protocols include Wi-Fi and have considerable cross functionality with IEEE 802 PAN protocols. Both are suitable for wireless communication within a vehicle. Other communication technology may also be suitable for wired or wireless communications within the vehicle, such as free-space optical communication (IrDA, for example), non-standardized consumer infrared (IR) protocols, and the like.

Now referring to FIG. 5, a flowchart illustrating operation of a system of method 500 for operating the battery management system 110 according to various embodiments. Various functions or processes illustrated may be performed in a different order, may be omitted, or may be repeatedly performed although not explicitly illustrated or described to accomplish various features and advantages described herein as those of ordinary skill in the art will understand.

Controlling or operating the battery management system 110 may include powering the vehicle as represented by 502. Powering the vehicle may include drawing power from one or more batteries to provide electricity to the BECM, or another component, or both. Powering the vehicle may be accomplished by a "key-on" event as an occupant approaches or enters the vehicle while carrying a key fob or other suitable accessory. After the vehicle powers up, the BECM may complete a self-check or diagnosis of the battery management system 110, as represented at 504. If an error is detected or determined during the self-check, the BECM then determines if one or more cells battery are not monitored or not in communication with the BECM, as represented at 506. If all of the cells are monitored, the controller branches to operation 516 that will be described in greater detail below.

If one more cells are not monitored, the BECM commands one or more contactors 122 to remain open, as represented at 508. Electrical current flow from the battery across the contactor is prevented by keeping the contactor(s) open. In response to the determination at 506, a warning light or indicator 116 may be illuminated to alert a user or operator of the issue, as represented at 510. The error may be provided to a network, either through a direct wired connection or a wireless connection, as represented as 512. The network may include the BECM 120 and one or more BPSMs 108. Finally, the system may reboot or restart, by shutting down and restarting, as represented at 514.

If the self-check or diagnosis of the cells is operating normally at 504, the self-check may be repeated after a predetermined amount of time, as represented at 516. This self-check may occur while the vehicle is driving or running, as opposed to the self-check at 504. If one or more cells are not monitored, the controller may go into a limited operation mode, as represented at 524. The limited operation mode may reduce the amount of power used by the system 110. After the system is placed in the limited operation mode, the warning indicator may be illuminated as represented at 510, the results of the check may be provided to the network as represented at 512, and the system may be rebooted as represented at 514.

If all of the cells are monitored at 518, the controller may then measure the voltage and pressure of each cell, as represented at 520. As was stated above, the voltage may be measured by the BPSM 108 and the pressure may be measured or determined by the resistance provided from the electrical-mechanical gauge 106. If the voltage is out of the predetermined range or the pressure is above a threshold, the BECM may open the contactor(s) 122 so the flow of electricity from the battery cells is terminated, as represented at 522. Upon opening the contactor(s), the warning indicator may be illuminated, the data may be provided to the network, and the system may reboot—as previously described.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle battery management system comprising:
a cell casing including connected walls surrounding a battery active region, at least one wall defining a weakened section, wherein portions of the at least one wall has a first strength and the weakened section has a second strength, less than the first strength;
a tripwire stretched across the weakened section and configured to, break to interrupt current flow therethrough responsive to a pressure within the cell casing surpassing a predetermined threshold causing the weakened section to bulge towards the tripwire;
an integrated circuit carried by one of the connected walls and electrically connected to the tripwire to measure a voltage associated with the battery active region;
contactors electrically connected to the cell casing; and
a battery electronic control module configured to, responsive to receiving a plurality of signals indicative of an electrical resistance, measured by the integrated circuit, surpassing a threshold, command the contactors to open.

2. The vehicle battery management system of claim 1 wherein the weakened section is recessed below a surface of one of the walls.

3. The vehicle battery management system of claim 2 wherein the weakened section is thinner than the connected walls.

4. The vehicle battery management system of claim 3 wherein the weakened section defines a plurality of scored areas.

5. The vehicle battery management system of claim 1 wherein the integrated circuit includes a reverse-biased diode configured to measure a temperature associated with the battery active region.

6. A vehicle comprising:
a cell casing surrounding a battery active region;

an integrated circuit configured to measure a voltage of the battery active region;

contactors electrically connected to the cell casing;

a conductor carried by the cell casing and configured to increase in electrical resistance responsive to deflection caused by bulging of the cell casing due to an accumulation of pressure therein; and a battery electronic control module configured to, responsive to receiving a plurality of signals indicative of an electrical resistance, measured by the integrated circuit, surpassing a threshold, command the contactors to open.

7. The vehicle of claim 6 further comprising:

a display configured to alert a user of the vehicle responsive to the electrical resistance surpassing a threshold.

8. The vehicle of claim 1 wherein the integrated circuit includes a reverse-biased diode configured to measure a temperature of the battery active region.

9. The vehicle of claim 8 wherein the battery electronic control module is further configured to open a set of contactors responsive to the temperature surpassing a threshold.

10. A method of controlling a battery management system comprising:

commanding a set of contactors electrically connected to a plurality of battery cells to open responsive to an electrical resistance of a strain gauge carried by a casing of each of the battery cells surpassing a threshold due to deflection of the strain gauges caused by bulging of one or more of the casings, and communicating a plurality of signals from each of the plurality of battery cells, each including an integrated circuit, to a controller before commanding the set of contactors to open.

11. The method of claim 10 further comprising:

commanding the controller to switch to a limited operation mode to decrease power supplied from a plurality of battery cells responsive to the controller not receiving a signal from at least one of the battery cells.

12. The method of claim 10 further comprising:

displaying a warning responsive to the electrical resistance surpassing the threshold.

* * * * *